United States Patent
Cheng

(10) Patent No.: US 8,010,088 B2
(45) Date of Patent: Aug. 30, 2011

(54) SYSTEM AND METHOD FOR USING A MOBILE PHONE AS A WIRELESS MICROPHONE

(75) Inventor: Kuo-Hsiang Cheng, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 452 days.

(21) Appl. No.: 12/328,785

(22) Filed: Dec. 5, 2008

(65) Prior Publication Data

US 2009/0209204 A1 Aug. 20, 2009

(30) Foreign Application Priority Data

Feb. 18, 2008 (CN) .......................... 2008 1 0300347

(51) Int. Cl.
*H04M 3/42* (2006.01)

(52) U.S. Cl. ....................................... 455/414.1; 84/609

(58) Field of Classification Search ............... 455/414.1, 455/566; 84/609
See application file for complete search history.

(56) References Cited

U.S. PATENT DOCUMENTS

| 6,640,086 | B2* | 10/2003 | Wall | 455/3.04 |
| 7,010,291 | B2* | 3/2006 | Iwanaga | 455/414.1 |
| 7,164,906 | B2* | 1/2007 | Herberger et al. | 455/414.1 |
| 7,689,237 | B2* | 3/2010 | Sagfors | 455/518 |
| 7,818,037 | B2* | 10/2010 | Lair et al. | 455/575.2 |

* cited by examiner

Primary Examiner — Kenneth B. Wells
(74) Attorney, Agent, or Firm — Altis Law Group, Inc.

(57) ABSTRACT

A system for using a mobile phone as a wireless microphone includes a mobile phone and a computer. The mobile phone imports voice signals from an outside environment, transforms the voice signals from analog signals into digital signals, and transmits the digital signals to the computer. The computer receives the digital signals, transforms the digital signals into analog signals, and exports the analog signals to the outside environment using a loudspeaker.

14 Claims, 3 Drawing Sheets

SYSTEM AND METHOD FOR USING A MOBILE PHONE AS A WIRELESS MICROPHONE

BACKGROUND

1. Technical Field

Embodiments of the present disclosure generally relate to new uses of mobile phones, and more particularly, to a system and method for using a mobile phone as a wireless microphone.

2. Description of Related Art

In present day, people bear the stresses and strains of modern life. Karaoke, as a form of leisure musical life, contributes to releasing the strains and remitting the stresses. Thus, karaoke is usually used to psychologically relax people.

Conventionally, when people want to sing karaoke, they will go to a recreational place or a restaurant having karaoke equipment. Additionally, people also can buy a DVD player, and sing karaoke using a microphone at home.

With the advent and popularity of personal computers, DVD players can be replaced by personal computers to be used to play karaoke. However, a microphone is still an important medium when singing karaoke with a personal computer. But microphones are not readily available at all times.

Thus, a system and method for overcoming the aforementioned problems is needed.

DETAILED DESCRIPTION OF CERTAIN INVENTIVE EMBODIMENTS

Figure 1:
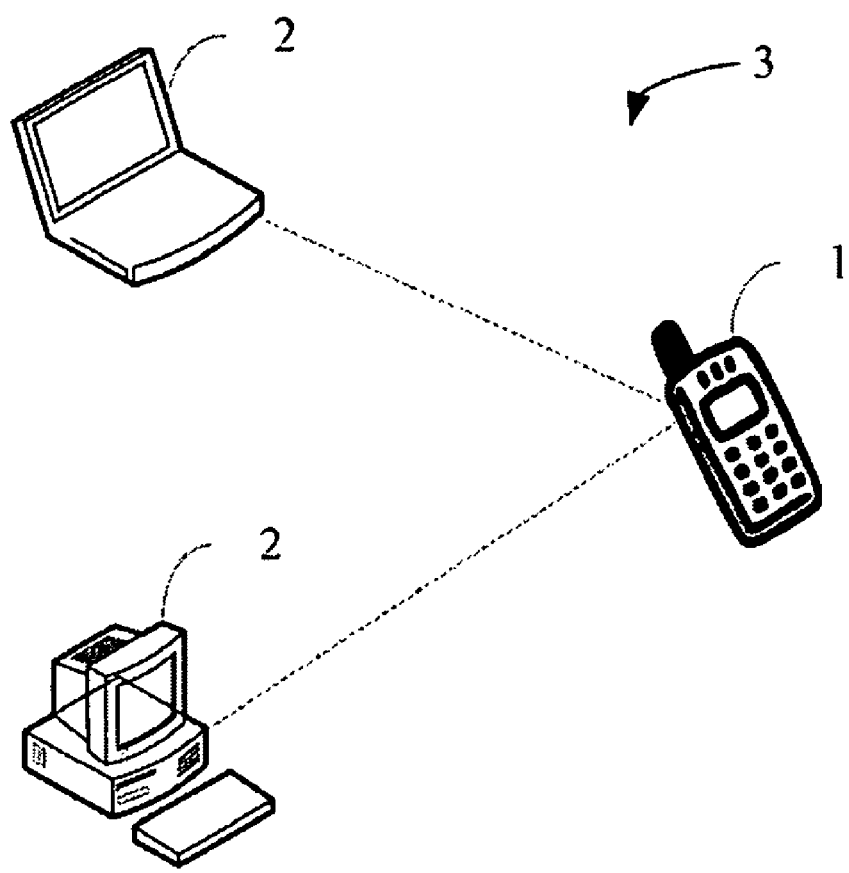
FIG. 1 is a block diagram of one embodiment of a system for using a mobile phone as a wireless microphone.

FIG. 1 is a block diagram of one embodiment of a system 3 for using a mobile phone 1 as a wireless microphone. In one embodiment, the system 3 includes at least one mobile phone 1 (one shown) and at least one computer 2 (two shown). The computer 2 may be a portable computer, a desktop, or any other suitable computer. The mobile phone 1 and the computer 2 are installed with function modules respectively, for receiving, transforming, and transmitting voice signals. The function modules will be depicted in FIG. 2 as follows.

Figure 2:
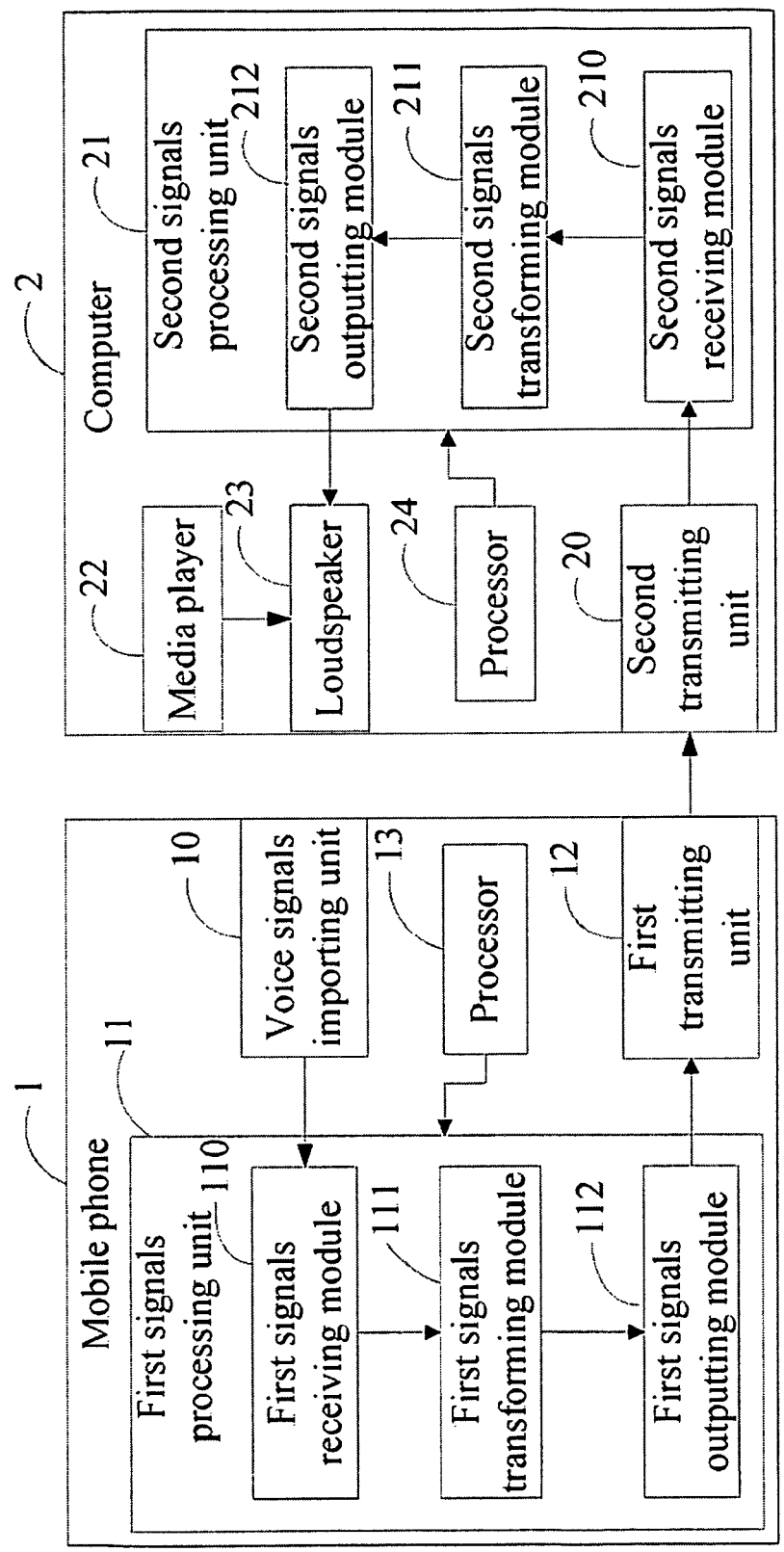
FIG. 2 is a block diagram of one embodiment of a mobile phone and a computer of FIG. 1 comprising function modules.

FIG. 2 is a block diagram of one embodiment of the mobile phone 1 and the computer 2 of FIG. 1 comprising function modules.

In one embodiment, the mobile phone 1 includes a voice signals importing unit 10, a first signals processing unit 11, a first transmitting unit 12, and a processor 13.

The voice signals importing unit 10 imports voice signals from an outside environment, such as the singing from a user. Depending on the embodiment, the voice signals are considered as first analog voice signals. In one embodiment, the voice signals importing unit 10 may be a microphone and/or a microphone speaker combination of the mobile phone 1.

The first signals processing unit 11 includes a first signals receiving module 110, a first signals transforming module 111, and a first signals outputting module 112. The first signals receiving module 110 is configured for receiving the first analog voice signals from the voice signals importing unit 10. The first signals transforming module 111 is configured for transforming the first analog voice signals into digital signals. The first signals outputting module 112 is configured for outputting the digital signals to the first transmitting unit 12.

The first transmitting unit 12 receives the digital signals from the first signals outputting module 112, and wirelessly transmits the digital signals to the computer 2. In one embodiment, the first transmitting unit 12 may be a BLUETOOTH unit. The processor 13 executes the first signals receiving module 110, the first signals transforming module 111, and the first signals outputting module 112.

The computer 2 includes a second transmitting unit 20, a second signals processing unit 21, a media player 22, a loudspeaker 23, and a processor 24.

The second transmitting unit 20 receives the digital signals from the first transmitting unit 12. In one embodiment, the second transmitting unit 20 may be a BLUETOOTH unit.

The second signals processing unit 21 includes a second signals receiving module 210, a second signals transforming module 211, and a second signals outputting unit 212. The second signals receiving module 210 is configured for receiving the digital signals from the second transmitting unit 20. The second signals transforming module 211 is configured for transforming the digital signals into second analog voice signals. The second signals outputting module 212 is configured for outputting the second analog voice signals.

The media player 22 plays background music for karaoke singing. The loudspeaker 23 receives the second analog voice signals from the second signals outputting module 212, and exports the second analog voice signals and the background music to the outside environment. The processor 24 executes the second signals receiving module 210, the second signals transforming module 211, and the second signals outputting module 212.

Figure 3:
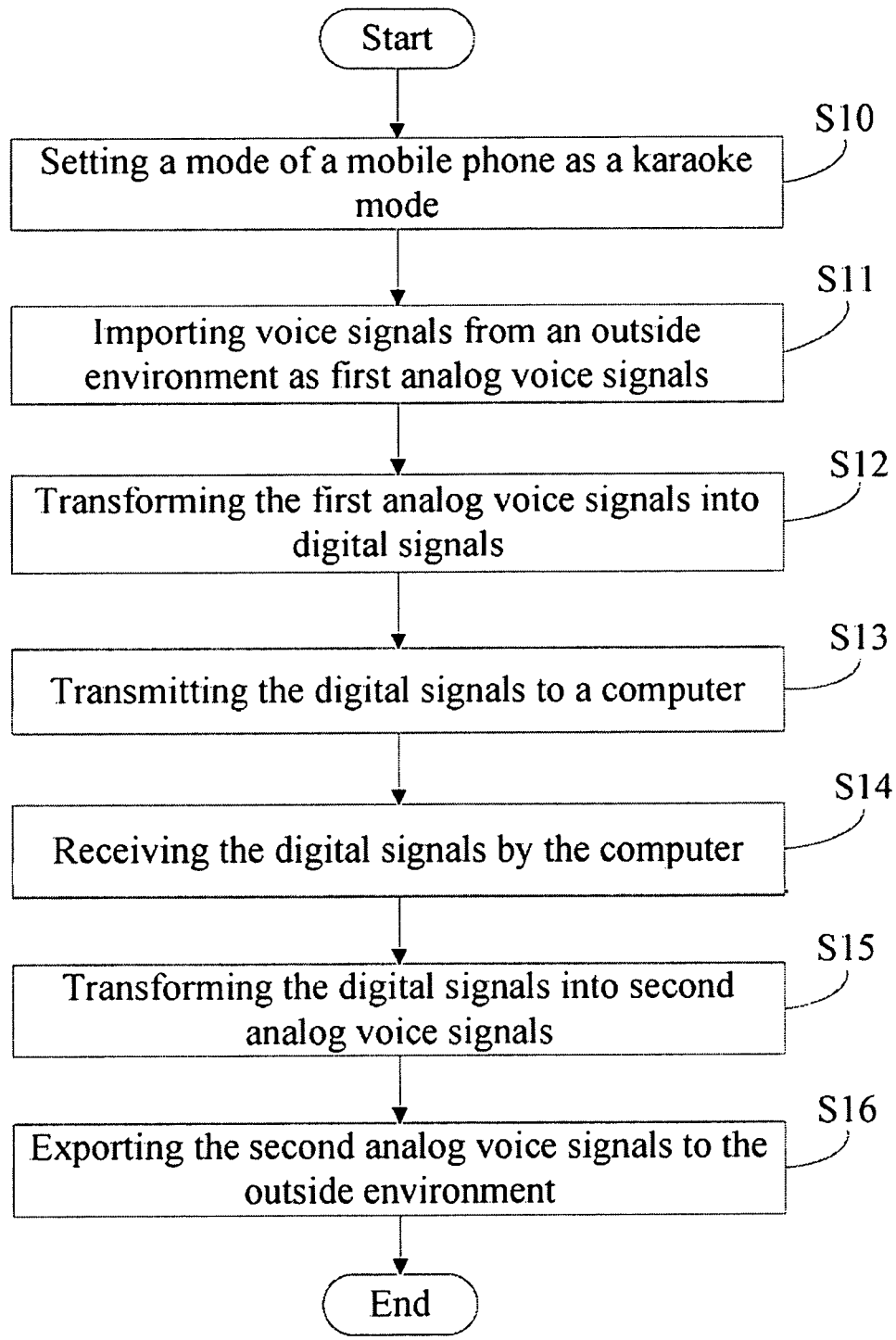
FIG. 3 is a flowchart illustrating one embodiment of a method for using a mobile phone as a wireless microphone.

FIG. 3 is a flowchart illustrating one embodiment of a method for using the mobile phone 1 as a wireless microphone. Depending on the embodiment, additional blocks in the flow of FIG. 3 may be added, others removed, and the ordering of the blocks may be changed.

In block S10, the mobile phone 1 is enabled to be in a karaoke mode. Accordingly, a user of the mobile phone 1 may sing some lyrics corresponding to a selected karaoke song.

In block S11, the voice signals importing unit 10 imports voice signals from an outside environment (e.g., the singing from the user) to the mobile phone 1. In the present embodiment, the voice signals are considered as first analog voice signals.

In block S12, the first signals processing unit 11 receives the first analog voice signals from the voice signals importing unit 10, transforms the first analog voice signals into digital signals, and outputs the digital signals to the first transmitting unit 12.

In block S13, the first transmitting unit 12 receives the digital signals from the first signals processing unit 11, and wirelessly transmits the digital signals to the computer 2. As mentioned above, the first transmitting unit 20 may be a BLUETOOTH unit.

In block S14, the second transmitting unit 20 of the computer 2 wirelessly receives the digital signals. As mentioned above, the second transmitting unit 20 may be a BLUETOOTH unit.

In block S15, the second signals processing unit 21 receives the digital signals from the second transmitting unit 20, transmits the digital signals into second analog voice signals, and outputting the second analog voice signals.

In block S16, the loudspeaker 23 receives the second analog voice signals from the second signals processing unit 21, and exports the second analog voice signals to the outside environment. In another embodiment, in block S16, the media player 22 plays background music for karaoke singing, and the loudspeaker 23 exports the background music together with the second analog voice signals to the outside environment.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A system for using a mobile phone as a wireless microphone, the system comprising at least one mobile phone and at least one computer, the at least one mobile phone comprising:
a voice signals importing unit configured for importing first analog voice signals from an outside environment;
a first signals receiving module configured for receiving the first analog voice signals from the voice signals importing unit;
a first signals transforming module configured for transforming the first analog voice signals into digital signals;
a first signals outputting module configured for outputting the digital signals; and
a first transmitting unit for receiving the digital signals from the first signals outputting module, and wirelessly transmitting the digital signals to the at least one computer;

the at least one computer comprising:
a second transmitting unit for wirelessly receiving the digital signals from the first transmitting unit;
a second signals receiving module configured for receiving the digital signals from the second transmitting unit;
a second signals transforming module configured for transforming the digital signals into second analog voice signals;
a second signals outputting module configured for outputting the second analog voice signals;
a loudspeaker for receiving the second analog voice signals from the second signals outputting module, and exporting the second analog voice signals to the outside environment; and
a media player for playing background music exported by the loudspeaker.

2. The system as described in claim 1, wherein the voice signals importing unit is a microphone.

3. The system as described in claim 1, wherein the first transmitting unit is a BLUETOOTH unit.

4. The system as described in claim 1, wherein the second transmitting unit is a BLUETOOTH unit.

5. A method for using a mobile phone as a wireless microphone, comprising:
receiving first analog voice signals from a voice signals importing unit of the mobile phone, wherein the first analog voice signals comprise voice signals from an outside environment;
transforming the first analog voice signals into digital signals; and
wirelessly transmitting the digital signals to at least one computer, wherein the at least one computer comprises:
a second transmitting unit for wirelessly receiving the digital signals;
a second signals receiving module configured for receiving the digital signals from the second transmitting unit;
a second signals transforming module configured for transforming the digital signals into second analog voice signals;
a second signals outputting module configured for outputting the second analog voice signals;
a loudspeaker for receiving the second analog voice signals from the second signals outputting module, and exporting the second analog voice signals to the outside environment; and
displaying and exporting background music together with the second analog voice signals.

6. The method as described in claim 5, the method further comprising the step of:
setting a mode of the mobile phone as a karaoke mode prior to receiving the first analog voice signals.

7. The method as described in claim 5, wherein the voice signals importing unit is a microphone.

8. The method as described in claim 5, wherein the first transmitting unit is a BLUETOOTH unit.

9. The method as described in claim 5, wherein the second transmitting unit is a BLUETOOTH unit.

10. A storage medium having stored thereon instructions that, when executed by a processor, causing the processor to perform a method for using a mobile phone as a wireless microphone, the method comprising:
importing first analog voice signals from an outside environment to a mobile phone
transforming the first analog voice signals into digital signals;
wirelessly transmitting the digital signals to a computer using a first transmitting unit of the mobile phone;
wirelessly receiving the digital signals by the computer using a second transmitting unit;
transforming the digital signals into second analog voice signals;
exporting the second analog voice signals to the outside environment by the computer; and
displaying and exporting background music together with the second analog voice signals.

11. The storage medium as described in claim 10, wherein the method further comprises the step of:
setting a mode of the mobile phone as a karaoke mode prior to receiving the first analog voice signals.

12. The medium as described in claim 10, wherein the voice signals importing unit is a microphone.

13. The storage medium as described in claim 10, wherein the first transmitting unit is a BLUETOOTH unit.

14. The storage medium as described in claim 10, wherein the second transmitting unit is a BLUETOOTH unit.

* * * * *